United States Patent
Bliton et al.

(10) Patent No.: US 8,439,161 B2
(45) Date of Patent: May 14, 2013

(54) ACOUSTICALLY TUNABLE SOUND ABSORPTION ARTICLES

(75) Inventors: Richard James Bliton, Greensboro, NC (US); Samuel Mark Gillette, Burlington, NC (US); Troy Raymond Buechler, Salisbury, NC (US)

(73) Assignee: Precision Fabrics Group, Inc., Greensboro, NC (US)

(*) Notice: Subject to any disclaimer, the term of this patent is extended or adjusted under 35 U.S.C. 154(b) by 179 days.

(21) Appl. No.: 12/814,022

(22) Filed: Jun. 11, 2010

(65) Prior Publication Data
US 2010/0314195 A1 Dec. 16, 2010

Related U.S. Application Data

(60) Provisional application No. 61/186,509, filed on Jun. 12, 2009.

(51) Int. Cl.
*E04B 1/82* (2006.01)
*E04B 2/02* (2006.01)
*E04B 1/84* (2006.01)
*E04B 1/74* (2006.01)
*E04B 2/00* (2006.01)

(52) U.S. Cl.
USPC .................. 181/290; 181/294; 181/286

(58) Field of Classification Search ........... 181/290, 181/294, 286, 284, 295, 204, 205; 296/39.3
See application file for complete search history.

(56) References Cited

U.S. PATENT DOCUMENTS

| | | | |
|---|---|---|---|
| 2,893,105 A * | 7/1959 | Lauterbach | 28/112 |
| 4,097,633 A | 6/1978 | Focht | |
| 4,283,457 A * | 8/1981 | Kolsky et al. | 442/30 |
| 4,726,987 A * | 2/1988 | Trask et al. | 442/373 |
| 5,186,996 A | 2/1993 | Alts | |
| 5,298,694 A | 3/1994 | Thompson et al. | |
| 5,418,031 A * | 5/1995 | English | 428/74 |
| 5,446,100 A * | 8/1995 | Durrance et al. | 525/221 |
| 5,459,291 A | 10/1995 | Haines et al. | |
| 5,554,238 A * | 9/1996 | English | 156/62.2 |
| 5,582,906 A * | 12/1996 | Romesberg et al. | 442/55 |
| 5,804,262 A * | 9/1998 | Stevens et al. | 428/31 |
| 5,886,306 A | 3/1999 | Patel et al. | |
| RE36,323 E | 10/1999 | Thompson et al. | |
| 6,124,222 A | 9/2000 | Gebreselassie et al. | |
| 6,145,617 A | 11/2000 | Alts | |

(Continued)

FOREIGN PATENT DOCUMENTS

EP 0373135 B1 4/1996
WO WO 93/18218 A1 9/1993

(Continued)

OTHER PUBLICATIONS

Wyerman et al., "Optimization of Sound Absorbers Using Resistive Facings," 09NVC-341, 2009 SAE International.

(Continued)

*Primary Examiner* — Edgardo San Martin
(74) *Attorney, Agent, or Firm* — Myers Bigel Sibley & Sajovec, P.A.

(57) ABSTRACT

The present invention provides a tunable sound absorption facing which includes a cellulosic web and a nonwoven web entangled together. The facing has a controllable air flow resistance.

40 Claims, 3 Drawing Sheets

U.S. PATENT DOCUMENTS

| | | | |
|---|---|---|---|
| 6,214,456 B1 | 4/2001 | Boyd et al. | |
| 6,220,388 B1 | 4/2001 | Sanbora | |
| 6,443,257 B1 * | 9/2002 | Wiker et al. | 181/290 |
| 6,534,145 B1 | 3/2003 | Boyles | |
| 6,631,785 B2 | 10/2003 | Khambete et al. | |
| 6,648,100 B2 | 11/2003 | Ebbitt | |
| 6,720,068 B1 * | 4/2004 | Vanbemmel et al. | 428/317.9 |
| 6,893,711 B2 | 5/2005 | Williamson et al. | |
| 7,137,477 B2 | 11/2006 | Keller et al. | |
| 7,195,814 B2 | 3/2007 | Ista et al. | |
| 7,310,739 B2 | 12/2007 | Wu et al. | |
| 7,320,739 B2 | 1/2008 | Thompson, Jr. et al. | |
| 7,329,457 B2 | 2/2008 | Renard et al. | |
| 7,410,030 B2 | 8/2008 | Fusiki et al. | |
| 7,837,009 B2 * | 11/2010 | Gross et al. | 181/290 |
| 7,878,301 B2 * | 2/2011 | Gross et al. | 181/290 |
| 7,918,313 B2 * | 4/2011 | Gross et al. | 181/294 |
| 8,230,969 B2 | 7/2012 | Frederick et al. | |
| 2002/0025421 A1 | 2/2002 | Sugawara et al. | |
| 2004/0077247 A1 | 4/2004 | Schmidt et al. | |
| 2004/0131836 A1 | 7/2004 | Thompson | |
| 2004/0134048 A1 | 7/2004 | Hartgrove et al. | |
| 2006/0065482 A1 | 3/2006 | Schmidft et al. | |
| 2006/0090958 A1 | 5/2006 | Coates et al. | |
| 2006/0137799 A1 * | 6/2006 | Haque et al. | 156/62.2 |
| 2006/0237130 A1 | 10/2006 | Thompson | |
| 2007/0151800 A1 | 7/2007 | Olson et al. | |
| 2008/0121461 A1 | 5/2008 | Gross et al. | |
| 2010/0066121 A1 | 3/2010 | Gross | |
| 2010/0112881 A1 * | 5/2010 | Bahukudumbi | 442/1 |
| 2010/0147621 A1 | 6/2010 | Gillette | |
| 2011/0114414 A1 * | 5/2011 | Bliton et al. | 181/286 |
| 2011/0256791 A1 * | 10/2011 | Seidel et al. | 442/329 |
| 2011/0284319 A1 * | 11/2011 | Frederick et al. | 181/293 |

FOREIGN PATENT DOCUMENTS

| | | |
|---|---|---|
| WO | WO 98/13540 A1 | 4/1998 |
| WO | WO 2006/107847 A1 | 10/2006 |
| WO | WO 2008/062289 A2 | 5/2008 |
| WO | WO 2010/038486 A1 | 4/2010 |

OTHER PUBLICATIONS

Notification Concerning Transmittal of International Preliminary Report on Patentability corresponding to PCT/US2010/038311 mailed Dec. 22, 2011.

Notification of Transmittal of the International Search Report and the Written Opinion of the International Searching Authority, or the Declaration corresponding to PCT/US2010/059844 mailed Mar. 28, 2011.

Notification of Transmittal of the International Search Report and the Written Opinion of the International Searching Authority, or the Declaration corresponding to PCT/US2010/038311 mailed May 25, 2011.

Notification Concerning Transmittal of International Preliminary Report on Patentability corresponding to PCT/US2010/059844 mailed Dec. 27, 2012.

* cited by examiner

ACOUSTICALLY TUNABLE SOUND ABSORPTION ARTICLES

RELATED APPLICATION

This application claims priority from U.S. Provisional Patent Application No. 61/186,509; filed Jun. 12, 2009, the disclosure of which is incorporated herein by reference in its entirety.

FIELD OF THE INVENTION

The present invention relates to a sound absorption material, and particularly to the use of sound absorption materials in acoustic applications such as vehicles, appliances, and buildings.

BACKGROUND

Noise reduction in a wide variety of environments such as buildings, vehicles, i.e., equipment, etc., is generally considered as desirable. For example, in vehicles such as automobiles it is highly desirable to reduce the external noises, namely road noise, wind noise, engine noise, vibrations as well as internal noises through the use of various acoustic materials.

Often, acoustic engineers attempt to achieve sound attenuation by the use of various acoustic materials. For example, so-called scrim layers are often used over thick low density spacer materials and voids located in floor panels, headliners and door panels of a vehicle. One example is the use of perforated films as described in U.S. Pat. No. 4,097,633. It is believed, however, that various production and quality issues are problematic in this approach. Microfiber scrims have also been proposed and used in a multilayer acoustically tuned sound absorbing composite such as described in U.S. Pat. No. 6,631,785. Other examples of various scrim layers include U.S. Pat. Nos. 5,186,996; 5,298,694; 5,886,306; 6,145,617; 7,310,739; and U.S. Patent Application Publication No. 2007/051800.

However, there continues to be a need for acoustic materials having improved sound absorbing properties, wherein such materials are low in thickness, low in weight, low in cost, and provide the necessary safety and sound absorption properties.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

In view of the above discussion, an acoustically tunable sound absorption facing is provided. The acoustically tunable sound absorption facing, comprises cellulosic fibers entangled together, for example, via spunlacing. Such a sound absorption facing has controllable air flow resistance. The air flow resistance translates into acoustic performance measured in Rayls. A Rayl is one of two units of acoustic impedance. When sound waves pass through any physical substance the pressure of the waves causes the particles of the substance to move. The sound impedance is the ratio between the sound pressure and the particle velocity it produces. The impedance is one Rayl if unit pressure produces unit velocity. In MKS units, 1 Rayl equals 1 pascal-second per meter (Pa·s·m−1), or equivalently 1 newton-second per cubic meter (N·s·m−3). In SI base units, that's kg·s−1·m−2. In CGS units, 1 Rayl equals 1 dyne-second per cubic centimeter (dyn·s·cm−3).

1 CGS rayl=10 MKS Rayls.

The air flow resistance and, thus, the acoustic performance of the facing is controlled, or "tuned" by adjusting the facing construction, with regards to basis weight, cellulosic facing-to-nonwoven web ratio, and by the action of chemical and mechanical processing. Chemical finishing may include application of binder or filled binder coatings to fill in and reduce the permeability of the facing. Mechanical processing may include stretching, drawing, and/or overfeeding of the facing during the chemical finishing process, or calendaring the facing fabric after finishing to adjust the permeability. A facing, according to embodiments of the present invention, may be acoustically tuned to have air flow resistance in the range of about 245 rayls to about 2450 rayls. More preferably a facing may be tuned to have air flow resistance from about 400 rayls to about 1650 rayls, and more preferably, the facing may be tuned to have air flow resistance from about 800 rayls to about 1200 rayls.

According to some embodiments of the present invention, an acoustically tunable sound absorption facing having controllable air flow resistance comprises cellulosic fibers and a nonwoven fiber batt entangled together. The cellulosic fibers comprise between about 20 to 60 percent by weight of the sound absorption facing and the nonwoven batt comprises about 40 to 80 percent by weight of the facing. In some embodiments, the cellulosic fibers are in the form of a web or sheet. In some embodiments, the sound absorption facing has a basis weight of at least about 0.7 osy. In some embodiments, the sound absorption facing includes a flame retardant.

An acoustically tunable sound absorption facing, according to embodiments of the present invention, can be used in combination with one or more other layers or substrates to provide a sound attenuating laminate. Such a laminate can be used in a wide variety of environments including, but not limited to, vehicles. Additionally, a facing may be treated with finishes or coatings to impart color, flame resistance, resistance to oils and greases, water repellency, anti-mold and mildew, corrosion resistance, and antimicrobial properties.

An acoustically tunable sound absorption facing, according to embodiments of the present invention, may also be coated, printed, sintered, sprayed, or otherwise treated with an adhesive layer to enable bonding and molding of subsequent parts. These bonded and molded panels are typically comprised of a sound absorption facing, according to embodiments of the present invention, and a bulky, low density sound absorbing insulating panel.

Additionally, an acoustically tunable sound absorption facing, according to embodiments of the present invention, may be treated or fashioned in such a way to allow high levels of stretch when molded. This may be done by the incorporation of soft or elastomeric binders, soft or elastomeric fibers or a combination of such.

An acoustically tunable sound absorption facing, according to some embodiments of the present invention, can be used in combination with one or more other layers or substrates to provide a sound attenuating laminate. This laminate comprises a layer of the surface facing fabric of the invention laminated to a thick low density material, comprised of materials such as fiberglass batting, resinated fiberglass panels, rock wool, plastic foam, urethane foam, shoddy pad from waste fiber, polyester batting or resinated fiberfill, aerogel, closed cell foam, reticulated foam and other insulation materials known to the art. The addition of the facing fabric significantly improves the sound attenuation properties of the base absorber material, allowing for improved performance, and reduced weight. The facing fabric may also be positioned on the top and bottom of the low density insulator to form a sandwich-type trilaminate.

Such a laminate can be used in a wide variety of environments including vehicles, appliances, buildings, homes, and office furniture (i.e. office partitions), aircraft, commercial buildings, trains and motor coaches, theaters, audio studios, home audio or theater rooms, sound insulation for noisy equipment and machines, or other applications where sound attenuation is desired.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

DETAILED DESCRIPTION

Figure 1:
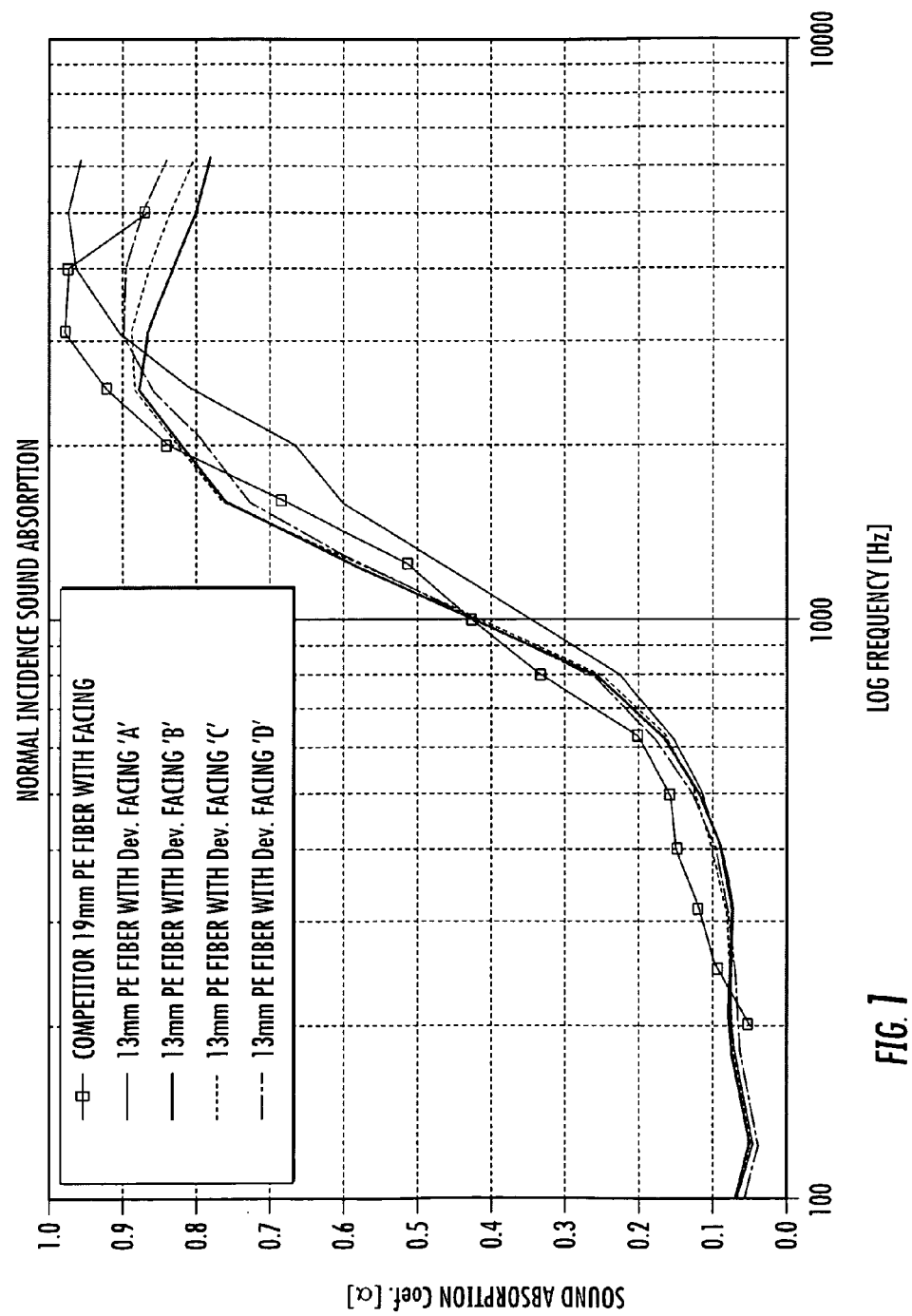
FIG. 1 is the measured influence of various developmental facings measured in the impedance tube.

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

In some embodiments, an acoustically tunable sound absorption facing is provided by a cellulosic web or sheet and a nonwoven web entangled together. The cellulosic web or sheet consists of a wet-laid or paper like sheet of cellulosic fiber. While wood fiber is preferred, other types of cellulosic fiber that can be wet-laid into a paper sheet could be used as the precursor cellulosic web. Additionally, minor amounts, not to exceed 49% of the cellulosic web could be comprised of synthetic fibers. Useful cellulosic fibers include wood fibers (pulp) such as bleached Kraft, softwood or hardwood, high-yield wood fibers, cotton, viscose, and other fibers suitable for making into a paper sheet. Other natural fibers include bagesse, milkweed, wheat straw, kenaf, jute, hemp, bamboo, cotton, and these natural fibers may be blended with the cellulosic fibers. Synthetic fibers that are prepared in very short fiber length may be formed into a wet-laid paper sheet. These fibers may be polyester, nylon, olefin, cellulose acetate, silk, wool, and other fibers known to the art. A preferred selection of wood fibers that provide the desired air flow resistance in the final cellulosic sheet may be employed for this facing; are red cedar and spruce pulps.

The nonwoven web portion may contain randomly oriented fibers or substantially aligned fibers. Exemplary fibers include, but are not limited to, polypropylene, polyethylene, polyethylene terephthalate, polyester, acetate, nylon, polylactic acid (PLA), glass, viscose and acrylic fibers, and blends thereof. Alternatively, performance fibers such as Nomex or Kevlar (DuPont), Kennel (Rhone Poulenc), polybenzimidazole (PBI-Hoechst), Basofil (BASF), polyetheretherketone (PEEK-Zyex Ltd.), Visil (Kuitu Finland Oy), Ultem, Lexan or Valox (GE Plastics) fibers may be used. The staple fiber batt may be made using 1.5 denier 1.5 inch long polyester drawn and crimped fibers which are known to spunlace well. However, other length and denier fibers including microfiber and splittable staple fibers may also be used for the nonwoven portion of the sound absorption facing.

The basis weight for the facing fabric before finishing is from about 0.7 to about 5.0 ounces per square yard (osy). Typically, the facing comprises 20-60 percent by weight cellulosic fibers by weight and 40-80 percent by weight other fibers.

As mentioned above, after the sound absorption facing has been formed and dried, it may be used without additional processing. If the initial air flow resistance of a given fabric is not in the desired range, the sound absorption facing can be further modified by finishing and/or calendaring. Stretching, bulking, drawing, drying and curing of the facing are additional steps that generally occur during the finishing or coating process. These processes are to modify and adjust the permeability and sound attenuating properties of the sound absorption facing so as to tune the sound attenuation properties. Additionally, the use of the scrim fabric of the invention on the face of a bulky and heavy sound absorber panel, allows reduction in the weight and bulk, without a loss of performance.

The chemical finishing of the facing comprises application of chemistry that will form film structure or fill in the structure of the facing thereby reducing the air permeability, and increasing the sound attenuation properties of the product. Emulsion and solution binders, adhesives, polymer dispersions, and thickeners may be used to reduce the permeability of the sheet. Additionally, the binder solutions may have added filler materials such as clay, talc, glass beads, ceramic beads and particles, graphite, calcium carbonate, barium sulfate, vermiculite, hydrated alumina, titanium dioxide, expandable fillers, expandable microspheres, swellable fillers, and other particulate filler materials to assist in decreasing the permeability of the sheet. Auxiliary chemicals such as corrosion inhibitors, flame retardants, oil and water repellents, pigments and colors, antimicrobial agents, and adhesive promoters may be added to enhance the properties of the sheet for a particular end use. For example, an acoustic panel for use in an automobile engine compartment would need to be both flame retardant and oil resistant.

Other types of finishing application equipment may be used to accomplish the addition of the chemical finish to the facing, including printing, paste coating, kiss coating, spray, roller coating, gravure, slot coating, and other application methods known to the art.

Various flame retardants may also be useful for finishing the sound absorption facing in order to impart flame retardant properties, low smoke generation and heat resistant properties and to increase the density or modify the air flow resistance of the facing. Flame retardants which are useful for this invention include durable, semi-durable and nondurable flame retardants, organic and inorganic flame retardants and combinations thereof. Furthermore, functional fillers such as alumina trihydrate, ammonium polyphosphate, compounds containing alkali and alkaline earth metals, borates, ammonium salts, nitrogen containing compounds, phosphates, phosphonates, halogens and sulfamates are useful for finishing and coating the facing. Other types of flame retardants which are of utility in this application include intumescent systems, vapor phase flame retardants and systems, endothermic flame retardants and combinations thereof. The list of possible flame retardants for this application is vast and will be obvious to those skilled in the art of finishing and coating fabrics.

Any water based emulsion or dispersion commonly known as a binder or latex may also be used to modify the air flow resistance of the sound absorption facing and to impart additional functional properties to the facing. Acrylic binders, vinyl acrylic binders, vinyl acetate binders, styrene containing binders, butyl containing binders, starch binders, polyurethane binders, and polyvinylalcohol containing binders are examples of binders that find utility in coating and finishing the facing. The binders may be film forming so as to reduce the air flow resistance of the sound absorption facing. The binders may also be loaded with a filler so as to reduce the air flow resistance of the sound absorption facing. Also, the binders may be salt tolerant so that they can be used in conjunction with ionic flame retardants. The use of thermoplastic binders can provide adhesive properties to the sound absorption facing if the binder is on the surface of the facing and the facing is subsequently reheated to bond to another surface. Binders may also be thermoset to limit the degree of crushing during the calendaring process, thereby allowing for a controllable and small reduction in air flow resistance. On the other hand, thermoplastic binders may be utilized to cause a large reduction in air flow resistance during the calendaring process. Other properties that the binder may impart include, but are not limited to, improved crock resistance, increased grab tensile and greater tear strength. Selected binders may be applied to the sound absorption facing to modify its stiffness and flexibility and to cause the facing to retain its shape if it is post molded or "B staged."

The concentration of binder in a pad finishing formulation is generally between 0 percent and 25 percent. When a foam finishing or coating process is utilized, binders may comprise between 0 percent and 100 percent of the finish formulation. In similar fashion flame retardants may comprise between 0 percent and 100 percent of a finishing formulation depending on application method and the properties that are being sought through finishing. Pigment dispersions, water repellents, waxes, lubricants, dyes, antimicrobials, defoamers, profoamers, corrosion inhibitors, antimicrobials, thickening agents, wetting agents, fillers, and other coating additives are useful in the present invention.

Additionally, the chemical modification of the scrim can be accomplished through solvent based, 100% solids based, powder application, hot melt application or other chemistry application methods known to the art.

The sound absorption facing may be used as a decorative layer, e.g., a fabric layer, or it may be covered with other layers to improve the aesthetic properties. In order to make bonding to high loft layers or decorative layers easier, it is possible to print or coat an adhesive pattern onto the facing which does not materially change the air flow resistance thereof. The adhesive can be applied as a hot melt using a pattern engraved in a gravure roll, powder coating, adhesive web, adhesive film or net, by screen printing or foam coating a pattern of compounded powdered adhesive or adhesive onto the facing, or by spraying adhesive onto the facing. The adhesive is selected according to the temperature desired for thermally reactivating the adhesive, according to the material that will be mated with the sound absorption facing and according to other factors such as the open time of the adhesive, the temperature capabilities of the processing equipment, adhesive viscosity, melt-flow index, and the strength and esthetic qualities of the bond. The array of thermally reactivateable adhesives, application equipment, and application techniques is vast; however, someone trained in the art can quickly arrive at a suitable system for this application. The types of adhesives that have been used to good effect include thermoplastic and thermoset adhesives such as polyester based adhesives, polyamide, urethane, and olefinic adhesives. When thermoset adhesives are applied to the facing it is important not to keep the adhesive below the cross linking temperature when it is applied. The adhesive may be used to adjust the air flow resistance of the facing.

Furthermore, continuous or perforated films or nets or other nonwoven material comprising low density polyethylene, high density polyethylene, ethylene vinyl acetate, polypropylene, mealeic anhydride, or any olefinic materials manufacture using either the Ziegler Natta or a transition metal catalyst or any blends of these materials may be tacked to the surface of the air flow resistant scrim. These films, nets, and nonwoven materials are attached to the scrim with the knowledge that they will melt into adhesive islands during subsequent processes and will have minimal effect on the final air flow resistance of the acoustic composite.

The following examples are merely illustrative of the invention, and are not limiting thereon.

EXAMPLE 1

We loaded a 155" wide roll of wood pulp/polyester spunlaced fabric (i.e., facing), known by the brand name Sontara Style 8851 onto a creel stand in front of a finishing frame. This Sontara fabric has an average air flow resistance of 496 Rayls. We padded the 2.1 ounce per square yard fabric, through a dip and nip style pad bath at 70 pounds per square inch to achieve a wet pick up of around 130 percent of the following formulation:

Mix Formula To 50 gallons of water we added 20 lbs of Suncryl CP-75 (Omnova), a vinyl acrylic copolymer dispersion), while stirring. We continued stirring and added 10 lbs of S-Inmont Black 6612 (BASF Corporation), a carbon black pigment dispersion, and then 210 lbs of Spartan 590FR (Spartan Flame Retardants, Inc), an ammonium phosphate type flame retardant. We increased the volume to 100 gallons of water while stirring to complete the mix.

After the pad process the fabric is pinned onto a pin tenter frame, stretched to width and dried as follows:
1. unstretched i.e. 0 percent resulting in an air flow resistance of 700 Rayls, a basis weight of 2.7 osy, and a SE rating for MVSS 302 flammability.
2. stretched to 159 inches 2.58 percent resulting in an air flow resistance of 578 Rayls, a basis weight of 2.6 osy, and a SE rating for MVSS 302 flammability.
3. stretched to 168 inches 8.38 percent resulting in an air flow resistance of 458 Rayls, a basis weight of 2.6 osy, and a SE rating for MVSS 302 flammability.

In another experiment we used the Sontara Style 8851 fabric (i.e., facing) mentioned above and padded the following mix onto the fabric at 70 psi to achieve a wet pick up of around 130 percent of the following mix:
Mix Formula To 50 gallons of 30° C. water we added 12 lbs of Lumacron Black SEF 300 percent (Dohmen), a disperse dye, while stirring. We continued stirring and added 240 lbs of Spartan 987FR (Spartan Flame Retardants, Inc), a non-durable, nonfogging ionic flame retardant. Then we increased the volume to 100 gallons of water while stirring to complete the mix.

After the pad process the fabric was pinned onto a pin tenter and stretched to the 174" 12.2 percent and dried resulting in an air flow resistance of 386 Rayls, a SE rating for MVSS 302 flammability, and a basis weight of 2.4 osy.

EXAMPLE 2

We loaded a 154" wide roll of blue wood pulp/polyester spunlaced fabric (i.e., facing), known by the brand name Sontara Style 9918 onto a creel stand in front of a finishing frame. This Sontara fabric has an average air flow resistance of 449 Rayls. We padded the 2.5 osy fabric, through a dip and nip style pad bath at 90 psi to achieve a wet pick up of around 139 percent using undiluted Spartan 987FR (Spartan Flame Retardants, Inc).

After the pad process the fabric was pinned onto a pin tenter and stretched from 155" to 166". The stretched fabric had an air flow resistance of 740 Rayls, a SE rating for MVSS 302 flammability, and a basis weight of 4.3 osy.

In a similar example we used Sontara 8851 and undiluted Spartan 987FR padded at 90 psi and necked the fabric from 155" down to 146". This resulted in a fabric with an average air flow resistance of 839 Rayls, a SE rating for MVSS 302 flammability, and a basis weight of 3.5 osy.

EXAMPLE 3

We followed the methodology of the above experiment with a few changes. The 100 gallon pad bath mix was made to incorporate the following ingredients: 25 pounds of Amgard CT (Rhodia Corporation) a durable cyclic phosphonate, 33.5 pounds of Spartan 880FR (Spartan Flame Retardants, Inc), 70 pounds of Inmont S Black 6612 (BASF Corporation), and 125 pounds of Phobol 8315 (Ciba Corporation) a fluorocarbon based water repellent.

In this example we used Sontara 8851 and a pad pressure of 90 psi and necked the fabric down from 155" to 143". This resulted in a fabric with an average air flow resistance of 839 Rayls, a SE rating for MVSS 302 flammability, and a basis weight of 2.7 osy.

EXAMPLE 4

We calendared fabrics (i.e., facings) from the examples above using a hot oil calendar having a composite roll over a steel roll running at 40 ypm, 2000 psi and 200° F.

1. The average air flow resistance of the 700 Rayl fabric, increased to 2048 Rayls (Dev. Facing A);
2. The average air flow resistance of the 578 Rayl fabric, increased to 1687 Rayls(Dev. Facing B);
3. The average air flow resistance of the 458 Rayl fabric, increased to 1629 Rayls (Dev. Facing C);
4. The average air flow resistance of the 386 Rayl fabric (processed at 1600 psi rather than 2000 psi), increased to 1143 Rayls (Dev. Facing D).

The normal incidence sound absorption is shown in FIG. 1.

EXAMPLEs 5-7

We loaded a 155" wide roll of wood pulp/polyester spunlaced fabric (i.e., facing) (Sontara Style 8851) onto a creel stand in front of a finishing frame. This Sontara fabric has an average air flow resistance of 496 Rayls. We padded the 2.1 ounce per square yard fabric, through a dip and nip style pad bath at 70 pounds per square inch to achieve a wet pick up of around 130 percent of a formulation:
Mix Formula To 50 gallons of water we added 70 lbs of Inmont S Black 6612 (BASF Corporation), a carbon black dispersion) while stirring. We continued stirring and added 70 lbs of acrylic latex dispersion (Rhoplex TR-25 (Dow Chemical Corporation). The volume of water was increased to 100 gallons of water while stirring to complete the mix. After the pad process the fabric was pinned onto a pin tenter and necked down in the machine direction from 155" to 143". The necked down fabric had an air flow resistance of 728 Rayls and a basis weight of 2.5 osy. This cellulosic fabric was combined with a nonwoven batt based on fiberglass fibers as follows:

| Example | Density of Nonwoven Fiber Batt (lbs/ft$^3$) |
| --- | --- |
| 5 | 2.0 |
| 6 | 1.5 |
| 7 | 1.25 |

COMPARATIVE EXAMPLE 1

A nonwoven fiberglass batt having a density of 2.0 lbs/ft$^3$ was combined with a 1.7 ounce/square yard, 100% polyester thermal bonded nonwoven fabric, with a coating of low density polyethylene adhesive, from Textil Gruppe Hof, with a permeability of 50-100 rayls (average 60 rayls).

Figure 2:
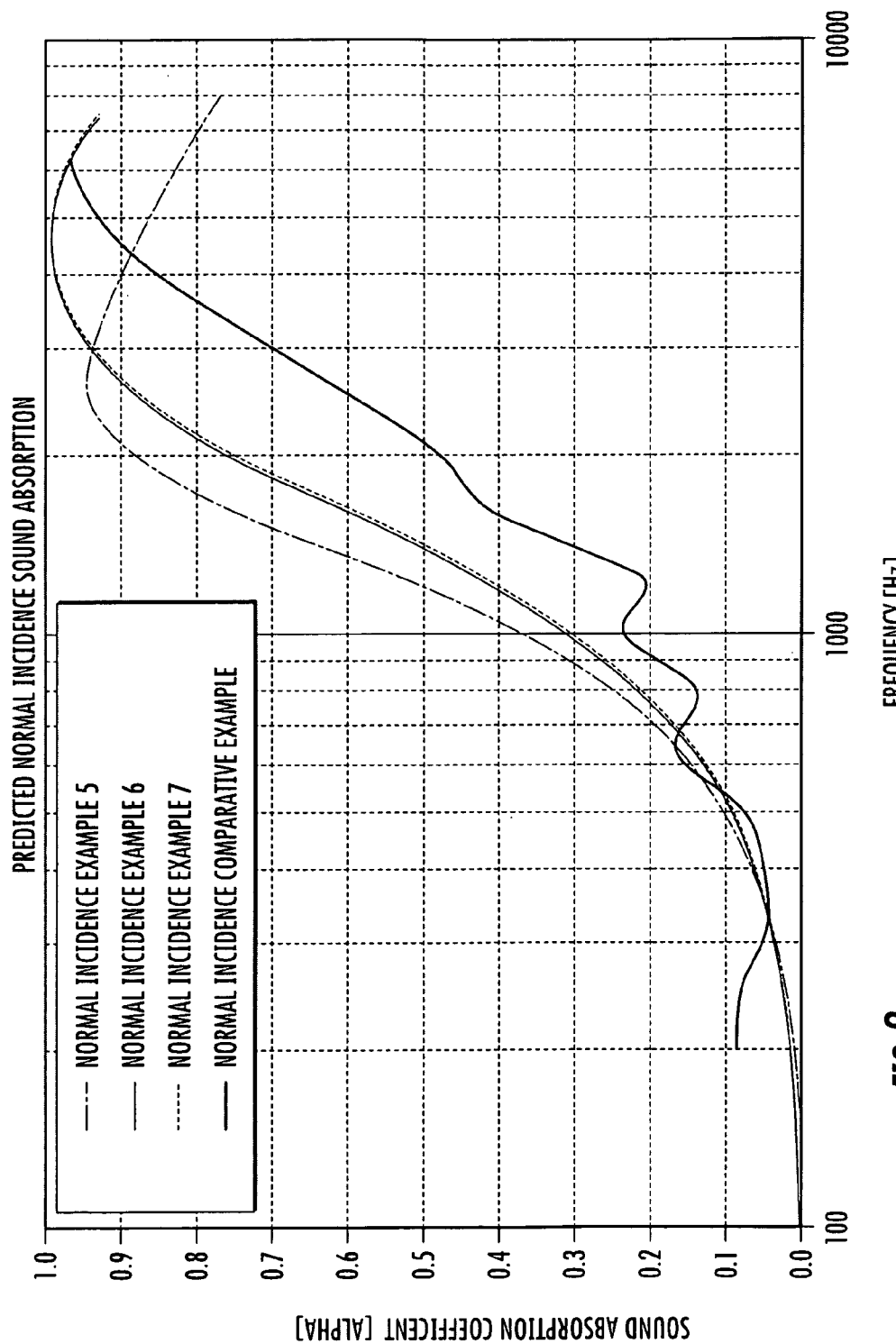
FIG. 2 is a predicted normal incidence sound absorption graph using ESI Nova modeling software.
Figure 3:
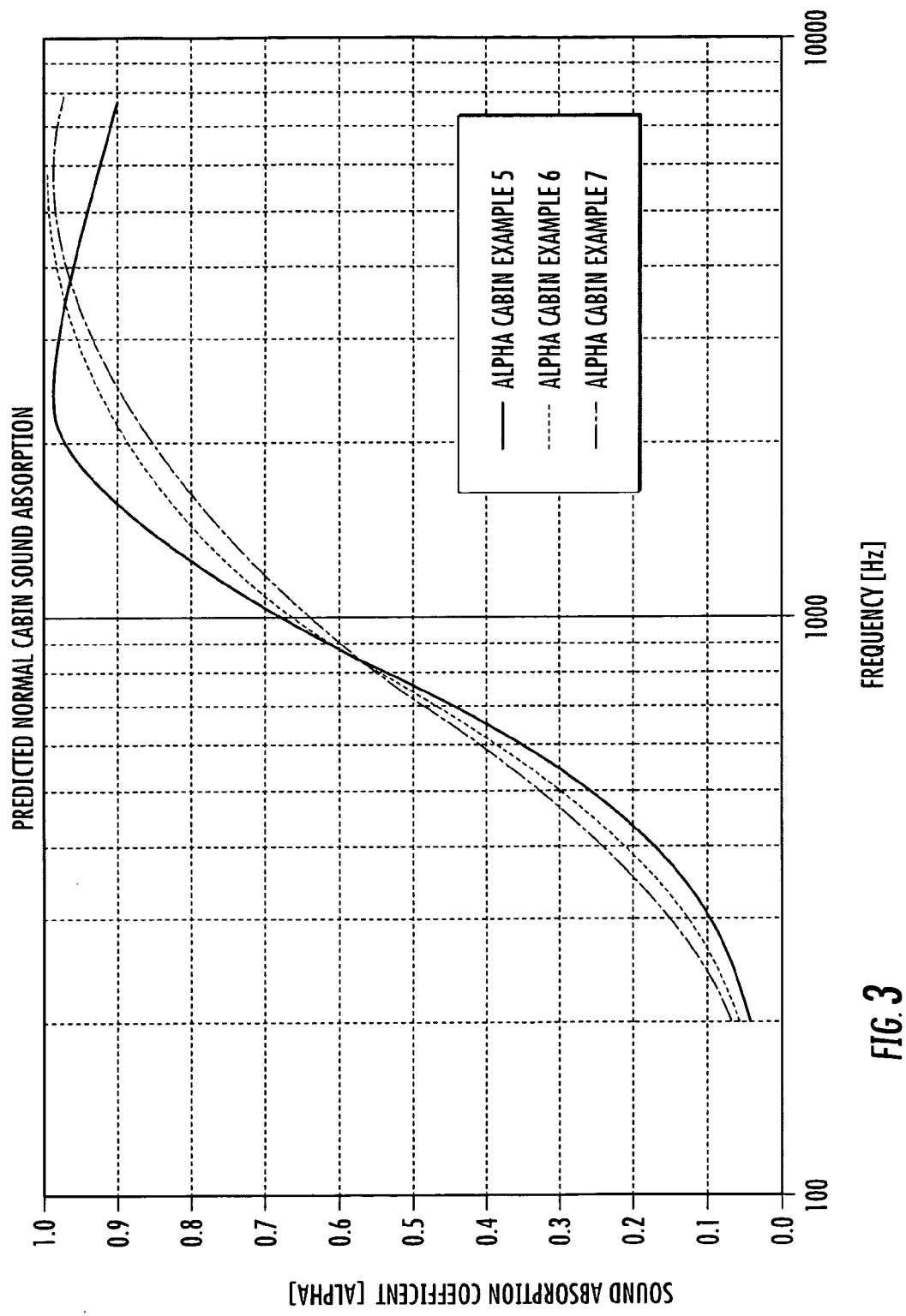
FIG. 3 is a predicted alpha cabin sound absorption graph using ESI modeling software.

FIG. 2 illustrates the predicted normal incidence sound absorption of Examples 5-7 and the Comparative Example 1. FIG. 3 measures the predicted alpha cabin sound absorption of Examples 5-7. This demonstrates that a facing, according to embodiments of the present invention, can provide acceptable sound absorption properties without requiring higher density and more expensive materials as the nonwoven batt.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed.

What is claimed:
1. An acoustically tunable sound absorption facing comprising a cellulosic layer and a nonwoven fiber batt,
   wherein the cellulosic layer and the nonwoven fiber batt are entangled together.
2. The sound absorption facing of claim 1, wherein the cellulosic layer is in the form of a web or sheet.

3. The sound absorption facing of claim 1, wherein the cellulosic layer comprises about 20 to 60 percent by weight of the sound absorption facing and wherein the nonwoven batt comprises about 40 to 80 percent by weight of the sound absorption facing.

4. The sound absorption facing of claim 1 having an acoustic impedance in the range of about 245 Rayls to about 2450 Rayls.

5. The sound absorption facing of claim 1 having a basis weight of at least about 0.7 ounces per square yard.

6. The sound absorption facing of claim 1 further comprising a flame retardant.

7. The sound absorption facing of claim 1 further comprising a film-forming binder.

8. The sound absorption facing of claim 1, wherein the cellulosic layer and the nonwoven fiber batt are entangled via spunlacing.

9. The sound absorption facing of claim 1, wherein the sound attenuating properties of the sound absorption facing are modified by one or more mechanical processes and/or one or more chemical treatment processes.

10. The sound absorption facing of claim 1, wherein the cellulosic layer comprises wood fibers, cotton fibers and/or viscose fibers.

11. The sound absorption facing of claim 1, wherein the nonwoven fiber batt comprises one or more fibers selected from the group consisting of polypropylene fibers, polyethylene fibers, polyethylene terephthalate fibers, polyester fibers, acetate fibers, nylon fibers, polylactic acid fibers, glass fibers, viscose fibers, aramid fibers, polybenzimidazole fibers, melamine fibers, polyetheretherketone fibers, silica-modified viscose fibers, polyetherimide fibers, polycarbonate fibers, polybutylene terephthalate fibers, polyethylene terephthalate fibers and acrylic fibers, and blends thereof.

12. The sound absorption facing of claim 1, further comprising an adhesive.

13. A sound absorption laminate comprising the sound absorption facing of claim 1 and at least one additional layer laminated thereto.

14. The sound absorption laminate of claim 13, wherein the at least one additional layer comprises fiberglass batting, one or more resinated fiberglass panels, rock wool, plastic foam, urethane foam, shoddy pad from waste fiber, polyester batting, resinated fiberfill, aerogel, closed cell foam and/or reticulated foam.

15. The sound absorption laminate according to claim 13, wherein the at least one additional layer is a fabric layer.

16. A sound absorption laminate, comprising:
first and second acoustically tunable sound absorption facings, each comprising a cellulosic layer and a nonwoven fiber batt wherein the cellulosic layer and the nonwoven fiber batt are entangled together; and
a low density layer of material sandwiched between the first and second facings, wherein the low density layer of material comprises fiberglass batting, one or more resinated fiberglass panels, rock wool, plastic foam, urethane foam, shoddy pad from waste fiber, polyester batting, resinated fiberfill, aerogel, closed cell foam and/or reticulated foam.

17. An article, comprising:
a) an acoustically tunable sound absorption facing comprising a cellulosic layer and a nonwoven fiber batt, wherein the cellulosic layer and the nonwoven fiber batt are entangled together;
b) a finish and/or coating applied to the sound absorption facing; and
c) a low density layer of material laminated to the sound absorption facing.

18. The article of claim 17, wherein the finish and/or coating imparts flame retardancy, adhesive properties, crock resistance, grab tensile, tear strength, color, microbial resistance, electrical conductivity, thermal conductivity, opacity, controllable modulus, water repellency, oil and grease repellency, corrosion resistance, and/or controllable surface texture to the sound absorption facing.

19. The article of claim 17, further comprising an adhesive.

20. The sound absorption facing of claim 3, having an acoustic impedance of at least about 400 Rayls and a basis weight of at least about 0.7 ounces per square yard.

21. The sound absorption facing of claim 20, further comprising a flame retardant.

22. The sound absorption facing of claim 20, further comprising a film-forming binder.

23. The sound absorption facing of claim 20, wherein the cellulosic layer and the nonwoven fiber batt are entangled via spunlacing.

24. The sound absorption facing of claim 20, wherein the sound attenuating properties of the sound absorption facing are modified by stretching, bulking and/or calendaring the sound absorption facing and/or by applying one or more finishes and/or coatings to the sound absorption facing.

25. The sound absorption facing of claim 20, wherein the nonwoven fiber batt comprises one or more fibers selected from the group consisting of polypropylene fibers, polyethylene fibers, polyethylene terephthalate fibers, polyester fibers, acetate fibers, nylon fibers, polylactic acid fibers, glass fibers, viscose fibers, aramid fibers, polybenzimidazole fibers, melamine fibers, polyetheretherketone fibers, silica-modified viscose fibers, polyetherimide fibers, polycarbonate fibers, polybutylene terephthalate fibers, polyethylene terephalate fibers and acrylic fibers, and blends thereof.

26. The sound absorption facing of claim 20, further comprising an adhesive.

27. A sound absorption laminate comprising the sound absorption facing of claim 20 and at least one additional layer.

28. The sound absorption laminate according to claim 27, wherein the at least one additional layer is a fabric layer.

29. An acoustically tunable sound absorption facing, comprising a cellulosic layer and a nonwoven fiber batt,
wherein the cellulosic layer and the nonwoven fiber batt are entangled together,
wherein the sound absorption facing further comprises a flame retardant, an oil repellant and/or a film-forming binder, and
wherein the sound absorption facing has a basis weight of at least about 0.7 ounces per square yard.

30. The sound absorption facing of claim 29, wherein the cellulosic layer comprises about 20 to 60 percent by weight of the sound absorption facing and wherein the nonwoven batt comprises about 40 to 80 percent by weight of the sound absorption facing.

31. The sound absorption facing of claim 29, wherein cellulosic fibers comprise about 20 to 60 percent by weight of the sound absorption facing and wherein noncellulosic fibers comprise about 40 to 80 percent by weight of the sound absorption facing.

32. The sound absorption facing of claim 29, wherein the cellulosic layer is in the form of a web or sheet.

33. The sound absorption facing of claim 29, wherein the cellulosic layer comprises wood fibers, cotton fibers and/or viscose fibers.

34. The sound absorption facing of claim 29, wherein the cellulosic layer comprises one or more synthetic fibers.

35. The sound absorption facing of claim 29 having an acoustic impedance in the range of about 245 Rayls to about 2450 Rayls.

36. The sound absorption facing of claim 29, wherein the sound attenuating properties of the sound absorption facing are modified by one or more mechanical processes.

37. The sound absorption facing of claim 36, wherein the one or more mechanical processes is/are selected from the group consisting of stretching, bulking and/or calendaring.

38. A sound absorption laminate comprising the sound absorption facing of claim 29 and at least one additional layer.

39. An acoustically tunable sound absorption facing, comprising a cellulosic layer and a nonwoven fiber batt,
   wherein the cellulosic layer comprises about 20 to 60 percent by weight of the sound absorption facing,
   wherein the nonwoven batt comprises about 40 to 80 percent by weight of the sound absorption facing,
   wherein the cellulosic layer and the nonwoven fiber batt are entangled together,
   wherein the sound absorption facing further comprises a flame retardant and an oil repellant, and
   wherein the sound attenuating properties of the sound absorption facing are modified by one or more mechanical processes.

40. An acoustically tunable sound absorption facing, comprising a cellulosic layer and a nonwoven fiber batt,
   wherein the cellulosic layer comprises about 20 to 60 percent by weight of the sound absorption facing,
   wherein the nonwoven batt comprises about 40 to 80 percent by weight of the sound absorption facing,
   wherein the cellulosic layer and the nonwoven fiber batt are entangled together via spunlacing,
   wherein the sound absorption facing further comprises a flame retardant, and
   wherein the sound attenuating properties of the sound absorption facing are modified by one or more mechanical processes.

* * * * *